(12) United States Patent
Endo

(10) Patent No.: US 7,545,258 B2
(45) Date of Patent: Jun. 9, 2009

(54) VEHICLE THEFT PREVENTION SYSTEM

(75) Inventor: Takeo Endo, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 443 days.

(21) Appl. No.: 11/401,277

(22) Filed: Apr. 11, 2006

(65) Prior Publication Data

US 2006/0232131 A1    Oct. 19, 2006

(30) Foreign Application Priority Data

Apr. 13, 2005    (JP)    ............................ 2005-116006

(51) Int. Cl.
*B60R 25/10*    (2006.01)
(52) U.S. Cl. .............................. 340/426.11; 340/426.12
(58) Field of Classification Search ............ 340/426.11, 340/426.12, 426.35, 5.6, 5.7, 5.72
See application file for complete search history.

(56) References Cited

U.S. PATENT DOCUMENTS

| | | | | | |
|---|---|---|---|---|---|
| 4,660,528 | A | * | 4/1987 | Buck | ........................... 123/333 |
| 5,113,427 | A | * | 5/1992 | Ryoichi et al. | ................ 340/7.1 |
| 5,307,048 | A | * | 4/1994 | Sonders | ................. 340/426.12 |
| 5,382,948 | A | * | 1/1995 | Richmond | ............. 340/825.36 |
| 5,438,311 | A | * | 8/1995 | Lane, Sr. | ................ 340/426.11 |
| 5,463,372 | A | * | 10/1995 | Mawyer, Sr. | ................. 340/428 |
| 5,513,244 | A | * | 4/1996 | Joao et al. | ................. 455/404.1 |
| 5,563,453 | A | * | 10/1996 | Nyfelt | ......................... 307/10.2 |
| 5,574,425 | A | * | 11/1996 | Shu | ......................... 340/426.12 |
| 5,602,426 | A | * | 2/1997 | Ecker | ......................... 307/10.2 |
| 5,623,245 | A | * | 4/1997 | Gilmore | ................. 340/426.12 |
| 5,638,044 | A | * | 6/1997 | Chua | ..................... 340/426.12 |
| 5,652,564 | A | * | 7/1997 | Winbush | ................. 340/426.12 |
| 5,745,030 | A | * | 4/1998 | Aaron | .................... 340/426.11 |
| 5,835,868 | A | * | 11/1998 | McElroy et al. | ................. 701/2 |
| 5,903,653 | A | * | 5/1999 | Ross et al. | .................... 380/271 |
| 5,917,405 | A | * | 6/1999 | Joao | ....................... 340/426.17 |
| 5,969,433 | A | * | 10/1999 | Maggiora et al. | .......... 307/10.5 |
| 6,717,511 | B2 | * | 4/2004 | Parker et al. | ........... 340/426.12 |
| 7,068,151 | B2 | * | 6/2006 | Giles et al. | ............... 340/426.1 |
| 2001/0056544 | A1 | | 12/2001 | Walker | |

(Continued)

FOREIGN PATENT DOCUMENTS

EP    1 418 097 A2    5/2004

(Continued)

*Primary Examiner*—Toan N Pham
*Assistant Examiner*—Travis R Hunnings
(74) *Attorney, Agent, or Firm*—Oblon, Spivak, McClelland, Maier & Neustadt, P.C.

(57) ABSTRACT

A vehicle theft prevention system switches an engine from an immobilized state to a mobilized state when an ID code received from a mobile device carried by a user matches an ID code registered in advance, and keeps the engine in the immobilized state when the ID code received from the mobile device does not match the ID code registered in advance. Further, when a disable command is received from the center and it is detected that the vehicle is in an unused state based on a state of a predetermined signal indicative of states of the vehicle, the system immobilizes the engine and prevents the engine from being switched from the established immobilized state to a mobilized state even if the ID code included in the signal received from the mobile device matches the ID code registered in advance by invalidating the ID code of the mobile device.

20 Claims, 2 Drawing Sheets

U.S. PATENT DOCUMENTS

| | | | |
|---|---|---|---|
| 2003/0206102 A1* | 11/2003 | Joao | 340/539.1 |
| 2003/0210129 A1* | 11/2003 | Aslund et al. | 340/5.31 |
| 2004/0075531 A1* | 4/2004 | Ieda et al. | 340/5.72 |
| 2004/0093291 A1* | 5/2004 | Bodin | 705/35 |

FOREIGN PATENT DOCUMENTS

| | | |
|---|---|---|
| JP | 2-246849 | 10/1990 |
| JP | 4-361464 | 12/1992 |
| JP | 5-12320 | 2/1993 |
| JP | 8-225061 | 9/1996 |
| JP | 9-11858 | 1/1997 |
| JP | 9-240431 | 9/1997 |
| JP | 2002-59812 | 2/2002 |
| JP | 2002-302014 | 10/2002 |
| JP | 2003-112606 | 4/2003 |
| JP | 2003-312395 | 11/2003 |
| JP | 2004-231034 | 8/2004 |
| WO | WO 98/16411 | 4/1998 |
| WO | WO 00/58136 | 10/2000 |

* cited by examiner

VEHICLE THEFT PREVENTION SYSTEM

INCORPORATION BY REFERENCE

The disclosure of Japanese Patent Application No. 2005-116006 filed on Apr. 13, 2005, including the specification, drawings and abstract is incorporated herein by reference in its entirety.

BACKGROUND OF THE INVENTION

1. Field of the Invention

The invention relates to a vehicle theft prevention system which prevents theft of a vehicle by disabling a predetermined electrical component mounted in the vehicle so that the electrical component is immobilized in response to a disable command received from a center.

2. Description of the Related Art

Japanese Patent Application Publication No. JP-A-2002-59812, for example, discloses related art in which, when theft of a vehicle is reported to a center, a "stolen" signal is transmitted to the stolen vehicle which, when received by the vehicle, prevents the engine from being restarted.

If the engine is prevented from being restarted while the vehicle is stopped, however, it may cause inconvenience to other vehicles and the like depending on where the vehicle is stopped. For example, if the engine stops for an idling stop when the vehicle is temporarily stopped at an intersection and restart of the engine for take-off is then prohibited (i.e., the vehicle is rendered unable to run), it may cause great inconvenience to those vehicles and the like behind that vehicle that are trying to get through the intersection.

SUMMARY OF THE INVENTION

In view of the foregoing problems, this invention thus provides a vehicle theft prevention system which is able to prevent unauthorized use of a vehicle by a thief without causing any inconvenience to other vehicles and the like.

Thus, one aspect of the invention relates to a vehicle theft prevention system that prevents theft of a vehicle, which is provided with a controller which performs control to i) disable a predetermined electrical component mounted in the vehicle such that the electrical component is immobilized in response to a disable command received from a center, and ii) when the disable command is received from the center, wait to disable the predetermined electrical component until it is detected, based on the generating state of a predetermined signal indicative of a variety of states of the vehicle, that the vehicle is in an unused state.

Also, another aspect of the invention relates to a vehicle theft prevention system that prevents theft of a vehicle, which is provided with the following controller, This controller switches the predetermined electrical component from an immobilized state to a mobilized state when an ID code included in a signal received from a mobile device carried by a user matches an ID code that was registered in advance. When the ID code included in the signal received from the mobile device does not match the ID code that was registered in advance, the controller keeps the predetermined electrical component in the immobilized state. Also, when a disable command is received from a center and it is detected that the vehicle is in an unused state based on a generating state of a predetermined signal indicative of a variety of states of the vehicle, the controller immobilizes the predetermined electrical component. The controller also prevents the predetermined electrical component from being switched from the established immobilized state to the mobilized state even if the ID code included in the signal received from the mobile device matches the ID code that was registered in advance by invalidating the ID code of the mobile device.

The vehicle theft prevention system provided with a controller such as that described above makes it possible to prevent unauthorized use of a vehicle by a thief without causing any inconvenience to other vehicles and the like.

BRIEF DESCRIPTION OF THE DRAWINGS

The features, advantages thereof, and technical and industrial significance of this invention will be better understood by reading the following detailed description of the exemplary embodiments of the invention, when considered in connection with the accompanying drawings, in which.

DESCRIPTION OF THE EXEMPLARY EMBODIMENTS

Figure 1:
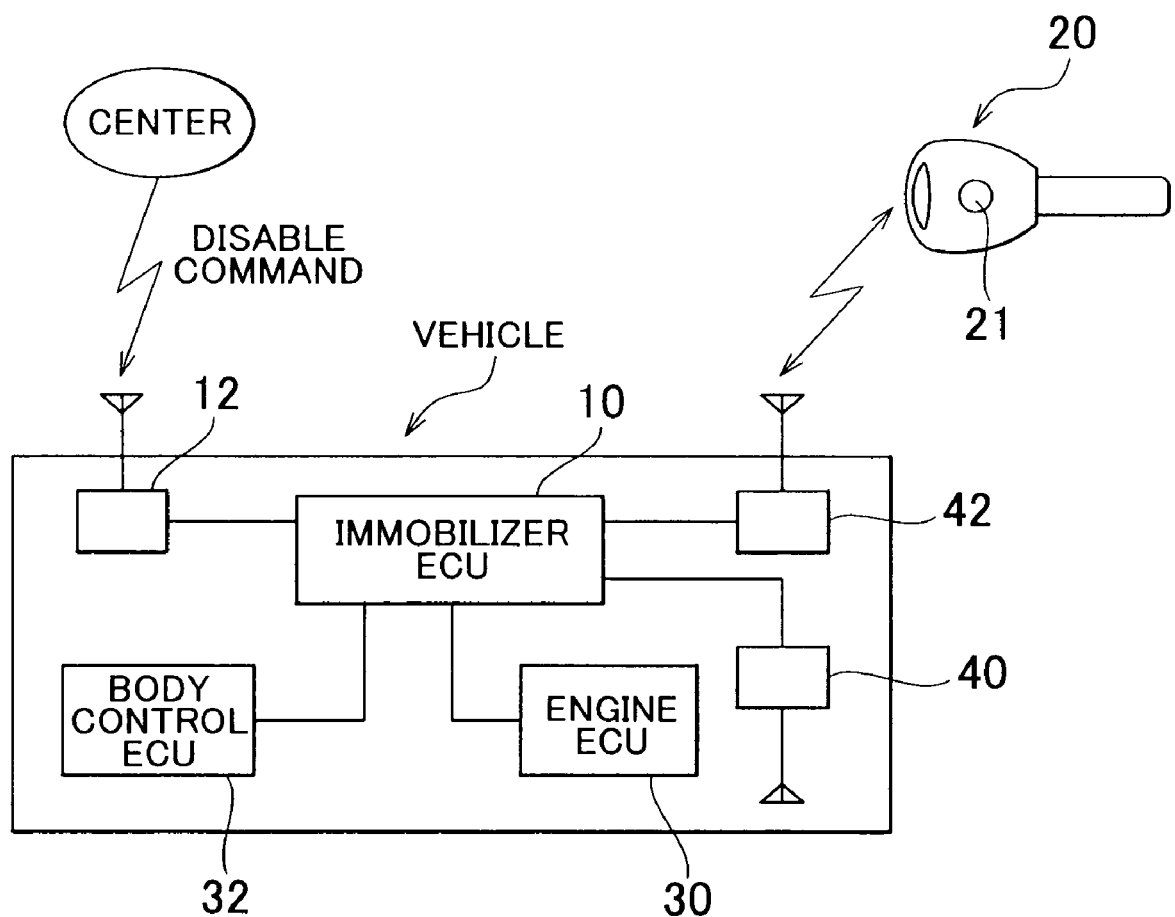
FIG. 1 is a system block view showing the structure of main portions of a vehicle theft prevention system according to an exemplary embodiment of the invention.

In the following description and the accompanying drawings, the present invention will be described in more detail with reference to exemplary embodiments. FIG. 1 is a system block diagram showing the structure of main portions of a vehicle theft prevention system according to an exemplary embodiment of the invention. The vehicle theft prevention system is configured around an ECU 10 (hereinafter referred to as "immobilizer ECU 10") which has a vehicle immobilizer function. The immobilizer ECU 10 is mounted in a vehicle and includes a microcomputer having a CPU, various memory (i.e., ROM and RAM). a timer, and the like, all of which are connected together via a bus, not shown. The immobilizer ECU 10 operates using a battery (or backup power supply), not shown, as its power supply.

Various electrical components (i.e., various sensors such as a vehicle speed sensor, various switches such as an ignition switch, and various ECUs such as a body control ECU 32 and an engine ECU 30) inside the vehicle are connected to the immobilizer ECU 10 via an appropriate bus such as a CAN (controller area network).

The vehicle is provided with an external transceiver 42 for external communication (i.e., communication outside the vehicle), which performs two-way communication by faint radio waves with a mobile device (a key) 20 carried by a user. This external transceiver 42 is mounted in a suitable position on the vehicle (such as on a door of the vehicle).

When the mobile device 20 receives a request signal transmitted from the external transceiver 42, it transmits a predetermined response signal in response to that request signal. This response signal contains a first ID code that has been assigned to the mobile device 20 in advance. Hereinafter, this two-way communication with the vehicle that is realized by the communication function of the mobile device 20 will be referred to as "smart communication", and the first ID code will be referred to as "smart ID".

The mobile device 20 has a switch 21 that can be operated by the user. When the user operates the switch 21, the mobile device 20 transmits a predetermined command signal. This command signal contains both a command requesting that the door lock be locked or unlocked, and a second ID code assigned to the mobile device 20 in advance. Hereinafter, one-way communication with the vehicle that is realized by the communication function of the mobile device 20 will be referred to as "wireless communication", and the second ID code will be referred to as "wireless ID".

An ID code corresponding to the smart ID and an ID code corresponding to the wireless ID are stored in the memory of the immobilizer ECU 10. In the following description, the smart ID and wireless ID assigned to the mobile device 20 side will be referred to as mobile device side smart ID and wireless ID, while the smart ID and the wireless ID stored on the vehicle side which correspond to the mobile device side smart ID and wireless ID will be referred to as vehicle side smart ID and wireless ID. These IDs may be any codes as long as there is a one-to-one correspondence between the mobile device side and the vehicle side.

The immobilizer ECU 10 checks the ID code contained in the signal transmitted from the mobile device 20 against the ID code in the memory, and performs various control according to the match results. For example, during the wireless communication described above, the immobilizer ECU 10 checks the mobile device side wireless ID contained in the command signal transmitted from the mobile device 20 against the vehicle side wireless ID contained in the stored data. If the two wireless IDs match, the immobilizer ECU 10 sends a command signal to the body control ECU 32. Upon receiving that command signal, the body control ECU 32 carries out the prescribed command (e.g., locking or unlocking of the door lock) contained in the command signal by sending a drive signal to a door lock actuator. Similarly, during smart communication, the immobilizer ECU 10 checks the smart ID transmitted from the mobile device 20 against the vehicle side smart ID contained in the stored data. If the two smart IDs match, the immobilizer ECU 10 sends a command signal the body control ECU 32 to lock or unlock the door lock using the door lock actuator. In this case, if the user is in possession of the mobile device 20, the door lock will unlock or lock even if the switch 21 of the mobile device 20 is not operated.

The vehicle is provided with an internal transceiver 40 for in-vehicle communication (i.e., communication within the vehicle), which performs two-way communication by faint radio waves with the mobile device 20 carried by the user. This internal transceiver 40 is mounted in an instrument panel in front of the driver's seat, for example.

When the mobile device 20 receives a request signal transmitted from the internal transceiver 40, it transmits a predetermined response signal in response to that request signal. This response signal contains a third ID code that has been assigned to the mobile device 20 in advance, Hereinafter, this two-way communication with the vehicle that is realized by the communication function of the mobile device 20 will be referred to as "transponder communication", and the third ID code will be referred to as "transponder ID".

An ID code (vehicle side transponder ID) corresponding to the transponder ID is stored in the memory of the immobilizer ECU 10.

When an opening and closing operation of the door is detected by a door switch after the immobilizer ECU 10 has unlocked the door lock based on the match results described above, the immobilizer ECU 10 commands the internal transceiver 40 to transmit a request signal to the mobile device 20 at predetermined intervals of time. When a response signal from the mobile device 20 in response to the request signal is received by the internal transceiver 40, the immobilizer ECU 10 checks the transponder ID transmitted from the mobile device 20 against the vehicle side transponder ID contained in the stored data. If the two transponder IDs match, the immobilizer ECU 10 sends an engine startup allowed signal to the engine ECU 30.

The engine ECU 30 then places the engine in a mobilized state from an immobilized state (i.e., releases the engine from the immobilized state) in response to the engine startup allowed signal from the immobilizer ECU 10. In the immobilized state, the engine ECU 30 performs a starter cut, engine ignition cut, fuel injection cut, or the like thus rendering the engine unable to start even if the ignition switch (or button) is operated by the user. In the mobilized state, on the other hand, the engine ECU 30 starts the engine with the starter as usual when the ignition switch (or button) is operated by the user, and thereafter, performs various engine control as usual in response to an operation of an accelerator pedal by the driver.

The immobilized state is established when, for example, the user carrying the mobile device 20 gets out of the vehicle and locks the door from the outside. For example, the immobilizer ECU 10 detects a pressing operation of a lock switch, not shown, provided on the outside of the vehicle door (such as on a door outer panel). When the pressing operation of the lock switch is detected, the immobilizer ECU 10 starts to transmit the request signal from the external transceiver 42 described above. The immobilizer ECU 10 then detects that the mobile device 20 is outside the vehicle by checking the smart ID contained in the response signal received from the mobile device 20 against the vehicle side smart ID. If the smart IDs match, the immobilizer ECU 10 sends a command to the body control ECU 32 to drive the door lock actuator to lock the door, as well as sends a command to the engine ECU 30 to place the engine in an immobilized state from a mobilized state. Alternatively, in response to a door lock command by the wireless communication described above, the immobilizer ECU 10 sends a command to the body control ECU 32 to drive the door lock actuator to lock the door, as well as sends a command to the engine ECU 30 to place the engine in an immobilized state from a mobilized state.

As described above, this exemplary embodiment prevents a door from being opened and the engine from being started by a user who does not have a valid mobile device 20, as well as places the engine in an immobilized state while the vehicle is not being used by an authorized user. Accordingly, even if a thief gains entry to the vehicle by breaking a window or the like, the vehicle will be disabled and not be able to be driven, thus ensuring a good security function.

That security function is unable to be ensured, however, if the valid mobile device 20 is stolen. Thus, the security function which appropriately prevents the use of a vehicle by a thief in the event that a valid mobile device 20 has been stolen will hereinafter be described in detail as a characteristic structure of the exemplary embodiment.

The immobilizer ECU 10 is connected to a communication device 12 which transmits and receives information between the vehicle and the center. The center is an infrastructure that performs an information providing service, and may perform various information providing services depending on the details of a contract with the user, for example. The communication device 12 is fixed to the vehicle in a suitable place so that it will not he destroyed by a thief.

The center is provided with a data base that retains stored data relating to the vehicle owned by the user and the like. The center is able to broadcast specific information such as traffic information to each vehicle, as well as transmit data to a specific vehicle by incorporating a unique vehicle ID assigned to each vehicle into the transmitted data. In this latter case, in this exemplary embodiment in particular, when theft of a vehicle is reported to the center by an authorized user, the center transmits a disable command to the vehicle (specified by the vehicle ID) of the user in order to prevent unauthorized use of that vehicle by the thief. At this time, the center continues to transmit the disable command at predetermined intervals of time until it receives a received response signal from the vehicle (the communication device 12) of the user, i.e., until the center can confirm that the communication device 12 has in fact received the disable command).

Figure 2:
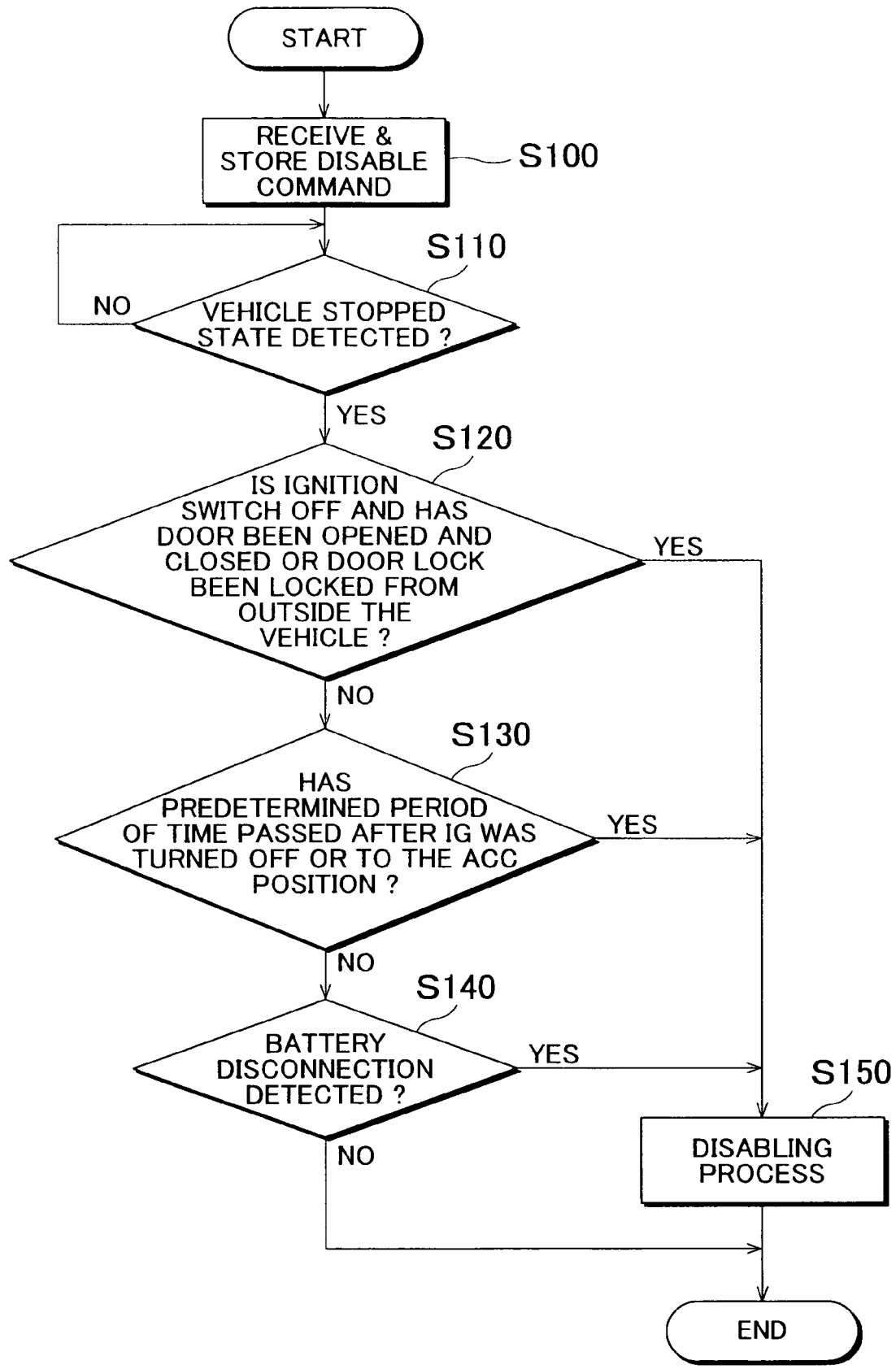
FIG. 2 is a flowchart illustrating a routine executed by an immobilizer ECU when a disable command is received.

FIG. 2 is a flowchart illustrating a routine that is executed by the immobilizer ECU 10 when the disable command is received.

First in step S100, when the immobilizer ECU 10 receives a disable command via the communication device 12, it stores and retains that disable command in a nonvolatile memory (such as EEPROM: electrically erasable programmable ROM). This is done in order to keep the disable command active even if the battery is disconnected by the thief, for example.

Next in step S110, the immobilizer ECU 10 determines the current running state of the vehicle based on the vehicle speed sensor and the like, and waits until the vehicle is stopped before continuing on to the next step. The determination that the vehicle is stopped can be made based on a sensor signal from, for example, the vehicle speed sensor, a brake sensor, a shift lever position sensor or the like.

When it is detected that the vehicle is stopped, the immobilizer ECU 10 then determines in step S120 whether the ignition switch is turned off and whether the door has been opened and closed or the door lock has been locked from outside the vehicle, based on the ignition signal and the door switch or the door lock signal. If the ignition switch is off and the door has been opened and closed or the door lock has been locked from outside the vehicle, the immobilizer ECU 10 determines that the vehicle is in an unused state and thus executes step S150. In any other case, the immobilizer ECU 10 executes step S130.

In step S150, the immobilizer ECU 10 performs a process that carries out the disabling command (hereinafter this process will be referred to as "disabling process"). More specifically, when the ignition switch is turned off and the door switch is switched from on (i.e., the door is closed) to off (i.e., the door is open) and then back to on again (i.e., when the door is opened and then closed), or when the door lock has been locked from outside the vehicle (i.e., locked using the wireless communication or smart communication described above), the immobilizer ECU 10 immediately sends a signal to the engine ECU 30 to place the engine in an immobilized state from a mobilized state, as well as invalidates the ID code of the mobile device 20. At the same time, when the door lock has not been locked from outside the vehicle, the immobilizer ECU 10 sends a signal to the body control ECU 32 to drive the door lock actuator to lock the door (this is unnecessary when the door lock is locked from outside the vehicle).

Once the disabling process is performed, the immobilizer ECU 10 then keeps the engine in the immobilized state by the engine ECU 30 (i.e., the immobilizer ECU 10 does not send an engine startup allowed signal to the engine ECU 30) and also does not allow the door lock to be released by the body control ECU 32 even if it is confirmed that the IDs match by the various methods of communication with the mobile device 20, as described above. Therefore, even if a thief is in possession of the mobile device 20 that has an authorized ID code, the door lock will not unlock, and even if the thief gains entry to the vehicle by breaking a window or the like, the engine will not start.

Also in this exemplary embodiment, instead of performing the disabling process as described above immediately when the disabling command is received, the disabling process is performed when the ignition switch is turned off and either the door has been opened and closed or the door lock has been locked from outside the vehicle, i.e., when the vehicle changes from being in a used state to an unused state. This prevents any inconvenience being caused to other vehicles or the like by the disabling process. That is, in this exemplary embodiment, the disabling process will not be executed simply because the condition that the engine is stopped for an idling stop when the vehicle is temporarily stopped at an intersection or the like, for example, is satisfied. Accordingly, it is possible to prevent causing any inconvenience to vehicles or the like behind the stolen vehicle that may otherwise be caused if the disabling process were performed at that time.

In step S150, the door that is opened and closed or that is locked may be restricted to only the door that is next to the driver's seat. In this case, the disabling process will not be executed if the door on the front passenger's side or a rear door are opened and closed, for example. This prevents a case in which an occupant who gets out of the vehicle at an intersection or the like from being erroneously determined as a shift in the vehicle state from a used state to an unused state. From the same point of view, the disabling process may also be executed when it has been determined, using, for example, a seat sensor (load sensor), a seat belt sensor, or a camera in a cabin of the vehicle, that the driver has gotten out of the vehicle.

Also, when the vehicle is provided with a navigation system, the condition that the vehicle not be in an inappropriate position such as at an intersection or near a crosswalk on the map may also be added as a condition that must be satisfied for the disabling process to be performed in step S150.

When the determination in step S120 is no, step S130 (step S140) is executed. These steps are useful for counteracting attempts by thieves to sneak around the theft prevention measures described above.

In step S130, the immobilizer ECU 10 determines whether a predetermined period of time (such as one hour) has passed after the ignition switch was turned off or to the ACC position. This period of time may be timed by a timer from the time the ignition switch was turned off or to the ACC position.

When the predetermined period of time has passed after the ignition switch was turned off or to the ACC position, the disabling process in step S150 is executed. Accordingly, it is possible to reliably perform the disabling process based on the disable command from the center even against a thief who turns the ignition switch off or to the ACC position but does not open and close the door or lock the door (i.e., even against a thief who leaves the door open or does not close it all the way when the vehicle is not being used).

In step S140, the immobilizer ECU 10 determines whether the battery has been disconnected. Battery disconnection may be detected by performing a data check of the RAM which receives its power from the battery. That is, the value of the RAM remains normal when there is a momentary battery interruption, but becomes an abnormal value when the battery is interrupted for longer, such as when it has been disconnected. It is therefore possible to distinguish between a simple momentary battery interruption and a battery interruption such as when the battery has been disconnected. When the battery is disconnected, the process in this step S140 may be executed using a backup battery as the power source.

When it is detected that the battery has been disconnected, the disabling process in step S150 is executed. Therefore, it is possible to reliably perform the disabling process based on a disable command from the center even against a thief who turns the ignition switch off or to the ACC position but does not open and close the door or lock the door, and who disconnects the battery (i.e., even against a thief who not only leaves the door open or does not close it all the way when the vehicle is not being used, but who also disconnects the battery to stop the timer from measuring time).

As described above, according to this exemplary embodiment, the disabling process is executed based on the disable command from the center only when it has been detected that the vehicle is in a predetermined unused state. As a result, it is possible to prevent unauthorized use of the vehicle by a thief without causing any inconvenience to other vehicles and the like.

Although the invention has been described herein with reference to an exemplary embodiment, the invention is not limited to this exemplary embodiment. Accordingly, this invention can be implemented with further variations and modifications as necessary without departing from the scope of the invention.

For example, in the foregoing exemplary embodiment, the disabling process does not allow the engine to be placed in a mobilized state from an immobilized state, which is achieved by an existing immobilizer function, even if a mobile device (i.e., a key) 20 with a valid ID is used, The invention is not particularly limited to this structure, however. For example, the disabling process can place and maintain the engine in a similar immobilized state even in a vehicle which does not have an immobilizer function.

Also in the foregoing exemplary embodiment, the disabling process is carried out by not sending an engine startup allowed signal to the engine ECU 30 even if the IDs match. Alternatively, however, the disabling process may also be carried out by erasing or changing the vehicle side ID.

Further, in the foregoing exemplary embodiment, a plurality of IDs such as the smart ID and the wireless ID are set in order to increase security. Alternatively, however, only one common ID may be used or additional IDs may be set.

Moreover, in the foregoing exemplary embodiment, a vehicle is described which, in addition to a normal keyless entry system, also has a smart key system which is extremely convenient. The invention is not limited to this, however. For example, the invention can also be applied to a vehicle which has neither a keyless entry system nor a smart key system. When the vehicle has neither system, there is no ID, but even in this case a disabling process may be performed which prohibits the engine from being restarted when it has been detected that the vehicle is not being used, as described above.

Also, in the foregoing exemplary embodiment, the engine is described as the power source. The driving source is not limited to an engine, however, but may alternatively be only an electric motor or a combination of an engine and an electric motor. Further, the power source of the electric motor may be a secondary battery or a fuel cell.

Also, in the foregoing exemplary embodiment, the engine may also be released from the state established by the disabling process described above by having a car dealer or the like perform the necessary work to ensure use of the vehicle after it has been returned to the rightful user.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A vehicle theft prevention system which prevents theft of a vehicle, comprising:
   a controller which disables a predetermined electrical component mounted in the vehicle such that the predetermined electrical component is immobilized in response to a disable command received from a center,
   wherein when the disable command is received from the center, the controller waits to disable the predetermined electrical component until the controller determines that the vehicle is in an unused state, wherein the controller determines that the vehicle is in the unused state when the controller determines that a power supplied to the vehicle from a first onboard battery is interrupted.

2. The vehicle theft prevention system according to claim 1, wherein the controller further determines whether the vehicle is in the unused state based on an ignition signal indicative of a driving source of the vehicle being switched from an operative state to a stopped state, and a signal indicative of an opening and closing operation of any door of the vehicle.

3. The vehicle theft prevention system according to claim 2, wherein the door is a door next to a driver's seat.

4. The vehicle theft prevention system according to claim 1, wherein the controller further determines whether the vehicle is in the unused state based on an ignition signal indicative of a driving source of the vehicle being switched from an operative state to a stopped state, and a signal from any of a seat sensor, a seat belt, and a camera in a cabin of the vehicle.

5. The vehicle theft prevention system according to claim 1, wherein the controller further determines whether the vehicle is in the unused state based on an ignition signal indicative of a driving source of the vehicle being switched from an operative state to a stopped state, and a signal indicative of a locking operation of a door of the vehicle.

6. The vehicle theft prevention system according to claim 1, wherein the unused state of the vehicle includes a state in which a driver is not in the vehicle when the vehicle is stopped.

7. The vehicle theft prevention system according to claim 1, wherein the controller includes a timer, and the unused state of the vehicle includes a state in which a period of time that is timed by the timer has become equal to or greater than a predetermined period of time after a driving source of the vehicle has been switched from an operative state to a stopped state.

8. The vehicle theft prevention system according to claim 7, wherein the timer measures the period of time during which the first onboard battery is used as a power source.

9. The vehicle theft prevention system which accordingly to claim 1, wherein the controller determines the power supplied to the vehicle from the first onboard battery is interrupted by performing a data check of a RAM which receives the power from the first onboard battery, wherein the controller determines the power supplied to vehicle from the first onboard battery is interrupted when the data check returns an abnormal result that indicates when the RAM has lost power from the first onboard battery, and wherein when the controller determines that the first onboard battery is disconnected, the disable command is executed by the controller using a second onboard battery.

10. The vehicle theft prevention system according to claim 9, wherein when the disable command is received from the center, the controller disables the predetermined electrical component when the controller determines that the vehicle is in the unused state based on an ignition signal indicative of a driving source of the vehicle being switched from an operative state to a stopped state, and a signal indicative of an opening and closing operation of any door of the vehicle.

11. The vehicle theft prevention system according to claim 9, wherein when the disable command is received from the center, the controller disables the predetermined electrical component when the controller determines that the vehicle is in the unused state based on an ignition signal indicative of a driving source of the vehicle being switched from an operative state to a stopped state, and a signal from any of a seat sensor, a seat belt, and a camera in a cabin of the vehicle.

12. The vehicle theft prevention system according to claim 9, wherein when the disable command is received from the center, the controller includes a timer, and the controller disables the predetermined electrical component when the controller determines that a period of time that is timed by the timer has become equal to or greater than a predetermined period of time after a driving source of the vehicle has been switched from an operative state to a stopped state.

13. A vehicle theft prevention system which prevents theft of a vehicle, comprising:
   a mobile device which transmits a command signal, wherein the command signal includes a transmitted ID code and a command code; and
   a controller which receives the command signal and which selectively switches a predetermined electrical component from an immobilized state to a mobilized state in response to the command signal
      wherein the controller compares the transmitted ID code received from the mobile device to a stored ID code that was registered in the controller in advance,
      wherein the controller executes the command code when the transmitted ID code received from the mobile device matches the stored ID code that was registered in the controller in advance,
      wherein the controller keeps the predetermined electrical component in the immobilized state when the transmitted ID code received from the mobile device does not match the stored ID code that was registered in the controller in advance,
      wherein when the controller receives a disable command from a center and it is detected that the vehicle is in an unused state based on a generating state of a predetermined signal indicative of a variety of states of the vehicle, the controller immobilizes the predetermined electrical component, and prevents the predetermined electrical component from being switched from the immobilized state to the mobilized state even if the controller receives the command signal including:
         the transmitted ID code which matches the stored ID code that was registered in the controller in advance and the command code, such that the command code is a re-enable command code.

14. The vehicle theft prevention system according to claim 13, wherein the controller determines whether the vehicle is in the unused state based on an ignition signal indicative of a driving source of the vehicle being switched from an operative state to a stopped state, and a signal indicative of an opening and closing operation of any door of the vehicle.

15. The vehicle theft prevention system according to claim 14, wherein the door is a door next to a driver's seat.

16. The vehicle theft prevention system according to claim 13, wherein the controller determines whether the vehicle is in the unused state based on an ignition signal indicative of a driving source of the vehicle being switched from an operative state to a stopped state, and a signal from any of a seat sensor, a seat belt, and a camera in a cabin of the vehicle.

17. The vehicle theft prevention system according to claim 13, wherein the controller determines whether the vehicle is in the unused state based on an ignition signal indicative of a driving source of the vehicle being switched from an operative state to a stopped state, and a signal indicative of a locking operation of a door of the vehicle.

18. The vehicle theft prevention system according to claim 13, wherein the unused state of the vehicle includes a state in which a driver is not in the vehicle when the vehicle is stopped.

19. The vehicle theft prevention system according to claim 13, wherein the controller includes a timer, and the unused state of the vehicle includes a state in which a period of time that is timed by the timer has become equal to or greater than a predetermined period of time after a driving source of the vehicle has been switched from an operative state to a stopped state.

20. The vehicle theft prevention system according to claim 19, wherein the timer measures the period of time during which the first onboard battery is used as a power source, and the controller determines the unused state of the vehicle includes a state in which a power supplied from the onboard battery to the vehicle is interrupted.

* * * * *